United States Patent
Combes et al.

(10) Patent No.: US 8,087,608 B2
(45) Date of Patent: Jan. 3, 2012

(54) SYSTEM FOR CONNECTING A CROSSBAR TO AN AIRCRAFT ENGINE PYLON

(75) Inventors: Stéphane Combes, Buzet / Tarn (FR);
Stéphane Levert, Toulouse (FR);
Laurent Lafont, Pechbusque (FR);
Dominique Moreau, Aucamville (FR)

(73) Assignee: Airbus Operations SAS, Toulouse (FR)

( * ) Notice: Subject to any disclaimer, the term of this patent is extended or adjusted under 35 U.S.C. 154(b) by 870 days.

(21) Appl. No.: 12/064,916

(22) PCT Filed: Aug. 31, 2006

(86) PCT No.: PCT/EP2006/065883
§ 371 (c)(1),
(2), (4) Date: Jun. 16, 2008

(87) PCT Pub. No.: WO2007/028764
PCT Pub. Date: Mar. 15, 2007

(65) Prior Publication Data
US 2008/0296430 A1 Dec. 4, 2008

(30) Foreign Application Priority Data
Sep. 5, 2005 (FR) ...................................... 05 52674

(51) Int. Cl.
*B64D 27/26* (2006.01)
(52) U.S. Cl. ........................................................ 244/54
(58) Field of Classification Search ................ 244/53 R, 244/54; 248/554; 60/796, 797, 798
See application file for complete search history.

(56) References Cited

U.S. PATENT DOCUMENTS

| 3,675,418 | A | * | 7/1972 | Lenkeit et al. | 244/54 |
| 4,079,981 | A | * | 3/1978 | Mahler et al. | 244/54 |
| 5,320,307 | A | * | 6/1994 | Spofford et al. | 244/54 |
| 6,296,203 | B1 | | 10/2001 | Manteiga et al. | |

FOREIGN PATENT DOCUMENTS
EP 0 564 126 10/1993
GB 1 236 917 6/1971

OTHER PUBLICATIONS
U.S. Appl. No. 12/067,192, filed Mar. 18, 2008, Lafont, et al.
U.S. Appl. No. 12/066,916, filed Mar. 14, 2008, Lafont.

* cited by examiner

*Primary Examiner* — Tien Dinh
*Assistant Examiner* — Richard R Green
(74) *Attorney, Agent, or Firm* — Oblon, Spivak, McClelland, Maier & Neustadt, L.L.P.

(57) ABSTRACT

An arrangement configured to connect an evener bar onto a rigid structure of an aircraft engine mount, including a pin system slidingly mounted in a first passageway of a bracket to permit its displacement along a first longitudinal axis, in a first direction from a normal extended position to a retracted position in which the pin system is retracted within this same bracket, and conversely. The arrangement also includes a pin extending member carried by the system and configured to be moved parallel to the longitudinal axis, in a second direction from a normal retracted position to an extended position in which the pin extending member is joined to the system and projects beyond the system, and conversely.

21 Claims, 10 Drawing Sheets

SYSTEM FOR CONNECTING A CROSSBAR TO AN AIRCRAFT ENGINE PYLON

TECHNICAL AREA

The present invention generally relates to the area of pylons for securing aircraft engines, each pylon being intended to be inserted between an aircraft wing and its associated engine.

The invention can be applied to any type of aircraft equipped with turbojet or turboprop engines.

This type of pylon, also called <<EMS>> (Engine Mounting Structure), permits the suspending of a turbojet engine below the aircraft wing, or the mounting of this turbojet engine above this same wing.

More particularly, the invention concerns an arrangement adapted to connect an evener bar of a thrust mount device transferring thrust loads generated by an aircraft engine, onto a rigid structure of a mount for this engine, and also concerns a thrust mount device integrating said arrangement.

Additionally, the invention also relates to a method for mounting an aircraft engine onto a rigid structure of said engine mount.

STATE OF THE PRIOR ART

Said engine mount is effectively designed to form the connecting interface between a turbojet engine and an aircraft wing. It allows the loads generated by its associated turbojet engine to be transferred to the structure of this aircraft, and also provides for the routing of fuel, electrical and hydraulic systems, and air between the engine and the aircraft.

To ensure the transmission of loads, the engine mount comprises a rigid structure, often of <<box>> type i.e. formed by the assembly of upper and lower spars and of side panels joined together via transversal ribs.

Also, the mount is equipped with mounting means inserted between the turbojet engine and the rigid structure, these means globally comprising two engine attachments and a thrust mount device to transfer thrust loads generated by the turbojet engine.

In the prior art, this thrust mount comprises for example two side links connected firstly to an aft part of the fan case of the turbojet engine, and secondly to an aft attachment fixed to the central engine case.

Similarly the engine mounting device also comprises another series of attachments forming a mounting system inserted between the rigid structure and the aircraft wing, this system usually consisting of two or three attachments.

Finally the engine mount is provided with a secondary structure to separate and support the different systems whilst carrying aerodynamic cowling.

As mentioned above, the solutions proposed in the prior art generally provide for connection of the thrust mount device to the aft attachment of the mounting means.

Therefore the evener bar of the thrust mount device on which the aft ends of the two side links are pivoted, is mounted on the body of the aft engine attachment before the engine is hoisted towards the engine mount. This means that, after the engine has been lifted towards the engine mount, the method to mount this engine on the rigid structure of the engine mount requires a step to mount the forward engine attachment and a step to mount the aft engine attachment, but no mounting step for the thrust mount device.

Yet, it has recently been observed that it is advantageous to make provision for two separate points of attachment on the rigid structure, one for the aft engine attachment and the other for the thrust mount device. For said configuration it has therefore been necessary to provide for an additional step to assemble the evener bar of the thrust mount device onto the rigid structure of the engine mount.

It has been noted however that this step is extremely difficult to implement since hoisting of the engine is usually made vertically, and the pin system, intended to enter into a pin system passageway in the evener bar previously connected to the engine, generally lies at an angle relative to the vertical, which evidently generates problems when these two elements are to be made to cooperate with each other.

SUMMARY OF THE INVENTION

The first objective of the invention is to propose an arrangement adapted for connecting an evener bar of a thrust mount device transferring thrust loads generated by an aircraft engine, onto a rigid structure of an engine mount, this arrangement being designed so as to facilitate the assembly step of the evener bar when mounting the engine on the rigid structure of the engine mount.

Also another purpose of the invention is to propose a thrust mount device integrating said arrangement, and an engine mount provided with said thrust mount device.

Finally, a further purpose of the invention is to present method to mount an engine on a rigid structure of said engine mount.

To do so, the subject-matter of the invention is an arrangement adapted for connecting an evener bar of a thrust mount device, transferring thrust loads generated by an aircraft engine, onto a rigid structure of an engine mount, this arrangement comprising firstly a bracket intended to be fixedly assembled onto the rigid structure and through which a first pin system passageway passes extending along a first longitudinal axis, and secondly comprising a pin system passing through the first pin system passageway. According to the invention, the pin system is slidingly mounted in the first passageway so as to allow its movement along the first longitudinal axis, in a first direction from a normal extended position in which it projects sufficiently from the bracket so that it is able to cooperate with the evener bar, to a retracted position in which it is retracted within this same bracket, and conversely in a second direction from the retracted position to the normal extended position. In addition, the arrangement also comprises a pin extending member carried internally by the pin system and able to be moved parallel to the first longitudinal axis, in the second direction from a normal retracted position in which it is retracted within the pin system to an extended position in which it is joined to the pin system projecting beyond it, and conversely in the first direction from the extended position to the normal retracted position.

Advantageously, the specific design of the arrangement according to the invention, allows the performing of a step to assemble the evener bar onto this arrangement which is relatively simple to conduct, even if the pin system is tilted with respect to the vertical and even if the engine is to be hoisted vertically in the direction of the engine mount. The placing of the engine in its final position relative to the engine mount or in a position close thereto, can be performed without encountering any blockage between the pin system and the evener bar while the engine is being lifted, since this pin system is mounted slidingly and can hence be moved to its retracted position in which it is retracted inside the bracket of the arrangement.

By way of indication, when the engine is being moved to its final position relative to the engine mount, the sliding pin system can be moved gradually from its normal extended position to its retracted position by bearing against the evener bar connected to the engine. Evidently, other solutions can be envisioned, such as a solution which consists of bringing and maintaining this pin system in its retracted position before starting to lift the engine.

Next, when the engine has reached its final position relative to the engine mount or a position close thereto, the pin extending member can then be deployed and brought to its extended position in which its small diameter, compared with the size of the passageway provided in the evener bar, enables its easy entry into this same passageway. The pin extending member passing through the pin system passageway of the evener bar and preferably extending beyond the latter can therefore form a grasping member, abutment member, etc., easily accessible by an operator, the movement applied to it being directly transmitted to the pin system secured to it.

Therefore, it suffices for example to use appropriate tooling to generate a translational movement of the pin extending member in the second direction, for the purpose of causing the pin system to pass through the evener bar until it returns to its normal extended position. The pin extending member can in turn be returned to its normal retracted position, by moving it in the first direction relative to the pin system. It is to be noted that another possibility detailed below can consist of making provision for the extending member to act as worm screw so as to cause displacement of the pin system in the second direction, towards its normal extended position.

Evidently, this easy mounting set forth above can be similarly applied for dismounting of the engine, in which the pin system is brought to its retracted position using the pin extending member, before starting to dismount the engine usually in vertical direction.

Preferably the pin system is equipped with abutment means enabling the pin system to be locked in translation in the second direction relative to the bracket, when the pin system lies in its normal extended position. Also, these abutment means are preferably in the form of a shoulder provided on the pin system.

Preferably, the arrangement comprises a guide member for the pin system, secured to the bracket. This guide member may be provided with an abutment able to lock the pin system in translation in the first direction relative to the bracket, so that it does not escape from the first passageway associated with it when it is moved in this same first direction. Also, the guide member may be designed to prevent rotation of the pin system about the first longitudinal axis during its translation movement along this same axis, thereby limiting risks that the pin system may become blocked in its first associated passageway.

Still preferably, the pin extending member is a screw mounted on the pin system, this screw entering inside this pin system. Provision may therefore be made so that this screw is arranged along the first longitudinal axis, hence positioned coaxially to the pin system carrying it. Evidently, other solutions may be envisioned to form this pin extending member, without departing from the scope of the invention.

Finally, the pin system comprises an inner pin and outer pin which are concentric, these two pins being secured to each other, the inner pin being hollow to house the pin extending member. This duplicating of the pin intended to pass through the evener bar therefore provides a so-called <<Fail Safe>> function in the event of rupture of either of the two pins.

The subject of the invention is also a thrust mount device to transfer thrust loads generated by the aircraft engine, this device being intended to be inserted between the engine and a rigid structure of an engine mount, and comprising the following elements:

an arrangement such as presented above;

two side thrust links each comprising a forward end intended to be connected to the engine, and an aft end; and an evener bar on which the two aft ends of the side thrust links are pivoted, this evener bar having a second pin system passageway passing through it extending along a second longitudinal axis merging with the first longitudinal axis, the pin system of the arrangement passing through this second passageway.

Preferably, this device also comprises dismountable means to block the pin system in translation, preventing translational movement of the pin system through the first and second passageways in the first direction. These dismountable means for blocking in translation may be in the form of a nut screwed onto the pin system and bearing upon the evener bar.

A further subject-matter of the present invention concerns an engine mount intended to be positioned between an aircraft wing and the engine, this mount comprising a rigid structure and engine mounting means on the rigid structure, these mounting means comprising a thrust mount device transferring thrust loads generated by the engine such as described above.

Preferably, the mounting means also comprise a forward attachment fixed to a first point of the rigid structure, and an aft attachment fixed to a second point of the rigid structure, the thrust mount device being fixed to the rigid structure at a third point separate from the first and second points.

The fact that the thrust mount device is now directly connected to the rigid structure, independently of the forward and aft attachments, makes it possible to limit considerably the interactions between loads transiting through the different elements forming the mounting means, and more specifically between the loads transiting via the aft engine attachment and the thrust mount device.

With said configuration, it is therefore advantageously possible to achieve highly optimised design of the aft attachment and thrust mount device, and on this account to avoid unnecessary over-sizing.

Preferably the pin system is positioned at an angle relative to a vertical direction of the engine mount, and preferably extends towards the aft away from the rigid structure.

Finally, a further subject of the invention is a method to mount an aircraft engine onto a rigid structure of an engine mount such as presented above, the method comprising a step to assemble the evener bar, previously connected to the engine via links, onto the arrangement previously mounted on the rigid structure, the assembly step comprising the following successive operations:

moving the pin extending member in the second direction relative to the pin system lying in its retracted position, so that it passes through the second passageway provided on the evener bar until it reaches its extended position; and setting the pin extending member in movement so as to cause displacement of the pin system, through the first and second pin system passageways, towards its normal extended position.

Evidently, before starting the operation to move the pin extending member in the second direction relative to the pin system, the pin system is brought to its retracted position using any means. Preferably, prior to the evener bar assembly step, the pin system is moved from its normal extended position to its retracted position by bearing against the evener bar when moving the engine towards its final position relative to the engine mount.

Still preferably, the evener bar assembly step is preceded by a step to mount a forward engine attachment and a step to mount an aft engine attachment.

Additionally, the operation setting the pin extending member in movement to cause displacement of the pin system through the first and second passageways, is performed using tooling which takes opposite bearing points on the evener bar and pin extending member respectively, and by rotating the pin extending member in the form of a screw cooperating with the pin system. Therefore, in this preferred embodiment, the screw acts as worm screw, and its rotation therefore leads to displacement of the pin system in the second direction relative to this screw, which itself remains in an identical position relative to the evener bar, in the direction of the first longitudinal axis.

Evidently, the operation to set in movement the pin extending member and thereby cause displacement of the pin system through the first and second passageways could be performed in any other manner, such as simply placing this member in translation in the second direction. Since the extending member and the pin system are joined to each other when the member takes up its extended position, the application of a translational movement to the latter is transmitted directly to the pin system.

Finally, provision may be made so that the operation to set the pin extending member in movement, causing displacement of the pin system through the first and second passageways, is conducted using a guide head mounted on one end of the pin system.

Other advantages and characteristics of the invention will become apparent in the detailed, non-limiting description given below.

BRIEF DESCRIPTION OF THE DRAWINGS

This description is made with reference to the appended drawings in which.

DETAILED DESCRIPTION OF PREFERRED EMBODIMENTS

Figure 1:
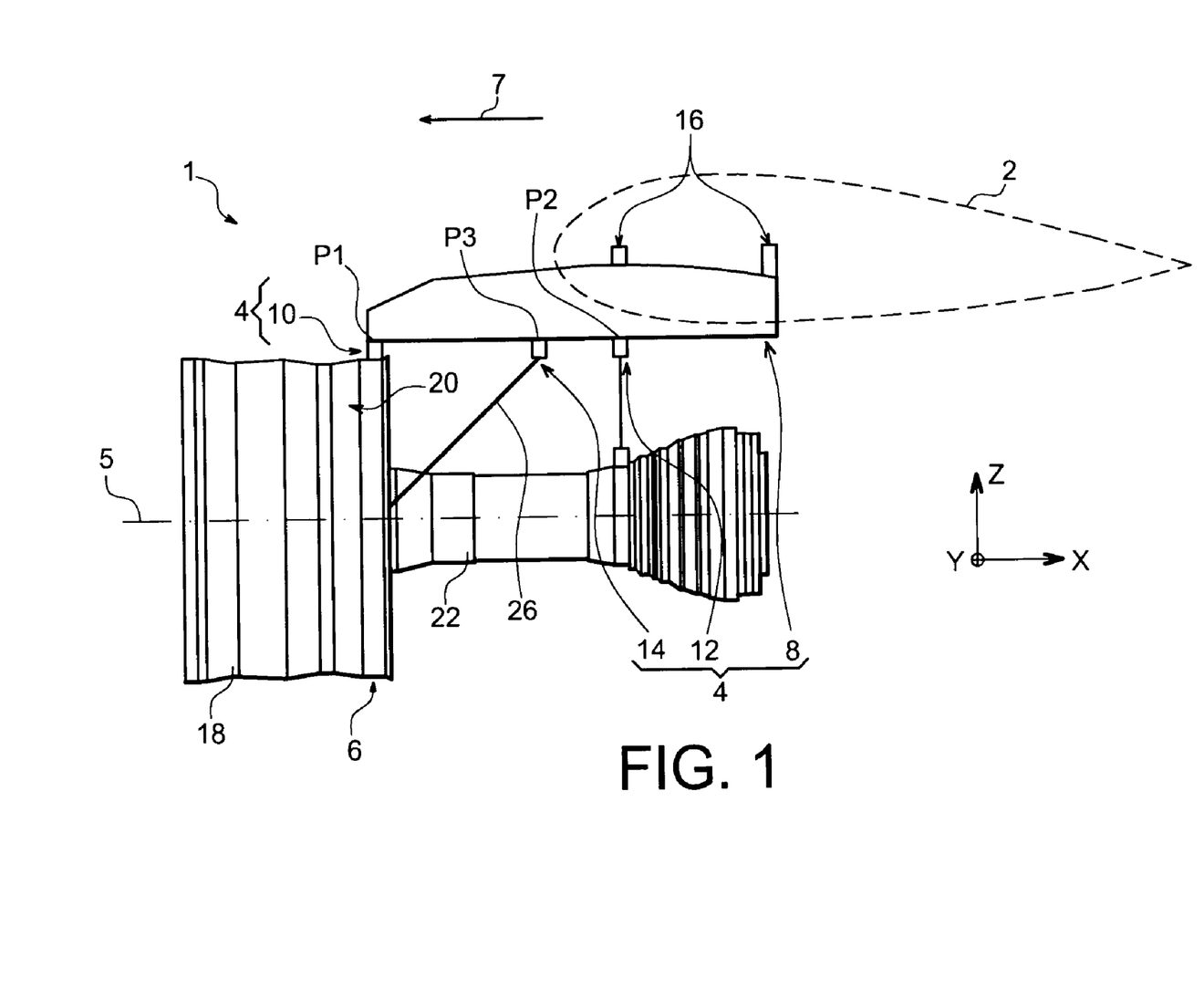
FIG. 1 is a schematic side view of an aircraft engine assembly, comprising an engine mount according to the invention.

With reference to FIG. 1, an aircraft engine assembly 1 can be seen, intended to be attached under a wing 2 of this aircraft represented by a dotted line for reasons of clarity, this assembly 1 comprising an engine mount 4 according to one preferred embodiment of the present invention, and an engine 6 such as a turbojet engine suspended under this engine mount 4.

Globally, the engine mount 4 comprises a rigid structure 8 carrying mounting means for the engine 6, these mounting means having a plurality of engine attachments 10, 12, and a thrust mount device 14 transferring thrust loads generated by the engine 6.

By way of indication, it is noted that the assembly 1 is intended to be surrounded by a nacelle (not shown) and the engine mount 4 comprises another series of attachment fittings 16 to ensure the suspending of this assembly 1 under the wings 2 of the aircraft.

In the remainder of the description, by convention, the longitudinal direction of the engine mount 4 is denoted X which is also comparable with the centreline axis of the turbojet engine 6, this direction X being parallel to a longitudinal axis 5 of this turbojet engine 6. Also, Y is used to designate the direction oriented transversally to the engine mount 4 and which is also comparable with the transverse direction of the turbojet engine, and Z is the vertical direction or height, these three directions X, Y and Z being orthogonal to one another.

Also, the terms <<forward>> and <<aft>> are to be considered with respect to a direction of travel of the aircraft subsequent to the thrust exerted by the jet engine 6, this direction being schematically illustrated by an arrow 7.

In FIG. 1 the two engine attachments 10, 12, the series of attachments 16 and the thrust mount device 14 can be seen, as well as the rigid structure 8 of the engine mount 4. The other constituent elements of this mount 4, not shown, such as the secondary structure to separate and support the different systems while supporting aerodynamic cowlings, are conventional elements, identical or similar to those found in the prior art, and known to persons skilled in the art. Therefore no detailed description will be given thereof.

Additionally, it is indicated that the turbojet engine 6, in its forward part, has a fan case 18 of large size delimiting an annular fan duct 20, and aft comprises a central case 22 of smaller size, enclosing the core of this turbojet engine. Cases 18 and 20 are evidently secured to each other.

As can be seen FIG. 1, the engine attachments 10, 12 of the mount 4 are designed to be two in number, and are respectively called the forward engine attachment and aft engine attachment.

In this preferred embodiment of the present invention, the rigid structure 8 is in the form of a box extending from aft to front substantially along direction X.

The box 8 therefore assumes a shape similar to the shape usually observed for turbojet engine mounts, particularly in that it is provided with transverse ribs (not shown) each of rectangular shape, and connecting forward and aft spars and side panels.

The mounting means of this preferred embodiment firstly comprise the forward engine attachment 10 positioned between a forward end of the rigid structure 8, also called a pyramid, and an upper part of the fan case 18. The forward engine attachment 10, of conventional design and known to those skilled in the art, is fixed to a first point P1 of the rigid structure 8. It is noted that the forward attachment could also be mounted on the central case 22, without departing from the scope of the present invention.

Also, the aft engine attachment 12, similarly of conventional design known to those skilled in the art, is positioned between the rigid structure 8 and the central case 22, and is fixed to a point P2 of the rigid structure 8 lying behind point P1.

The thrust mount device 14, schematically illustrated, is fixed to a third point P3 of the rigid structure 8, point P3 preferably lying between the two points P1 and P2. In this respect, it is noted that the above-mentioned points preferably lie in a vertical median plane of the engine mount (not shown).

By way of indication, from a side view as shown FIG. 1, the ratio of distances P1P3/P1P2 may lie within a broad range of 0.1 to 0.9, the chief desideratum being that the evener bar of the thrust mount device 14 is able to move freely when disengaged without being hampered by the two attachments 10 and 12.

Globally, the thrust mount device 14 which is detailed further on, has two side thrust links 26 (only one being visible FIG. 1), each of these links comprising a forward end joined to the central case 22 e.g. on or in the vicinity of a horizontal median plane of the turbojet engine 6.

Figure 2:
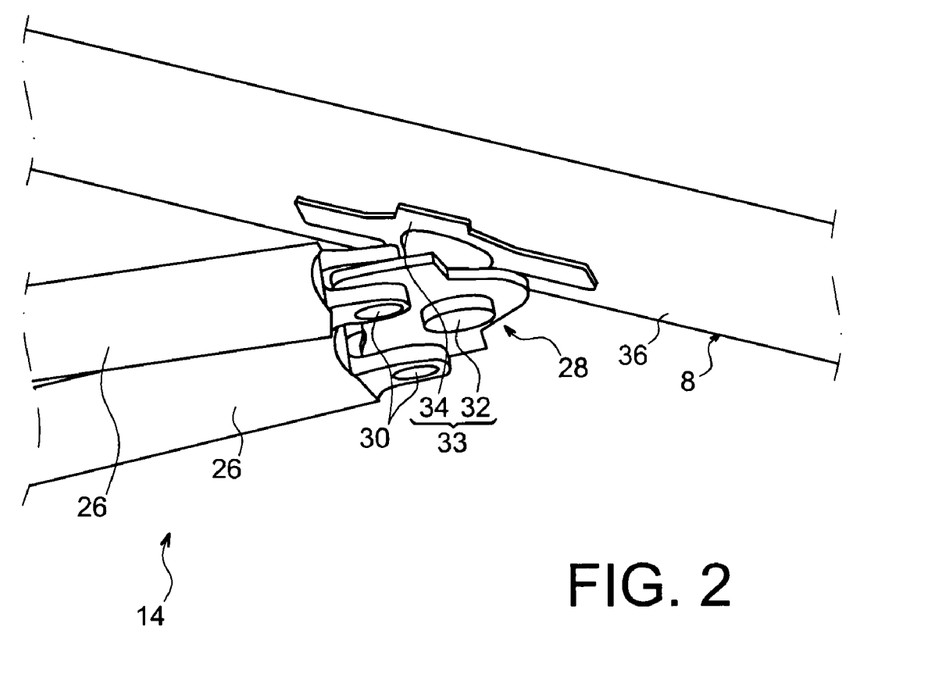
FIG. 2 is a partial schematic perspective view of the thrust mount device belonging to the engine mount shown FIG. 1.

With reference to FIG. 2, at an aft portion of this thrust mount device 14, it can be seen that the two side links 26 each have an aft end pivoted on an evener bar 28, via pins 28 which are preferably double pins.

The evener bar 28 is pivot mounted on an arrangement 33 of the device 14, this arrangement 33 illustrated schematically being the subject of the present invention and generally comprising a pin system 32 and a bracket 34 fixedly mounted on a lower spar 36 of the rigid structure 8.

Figure 3A:
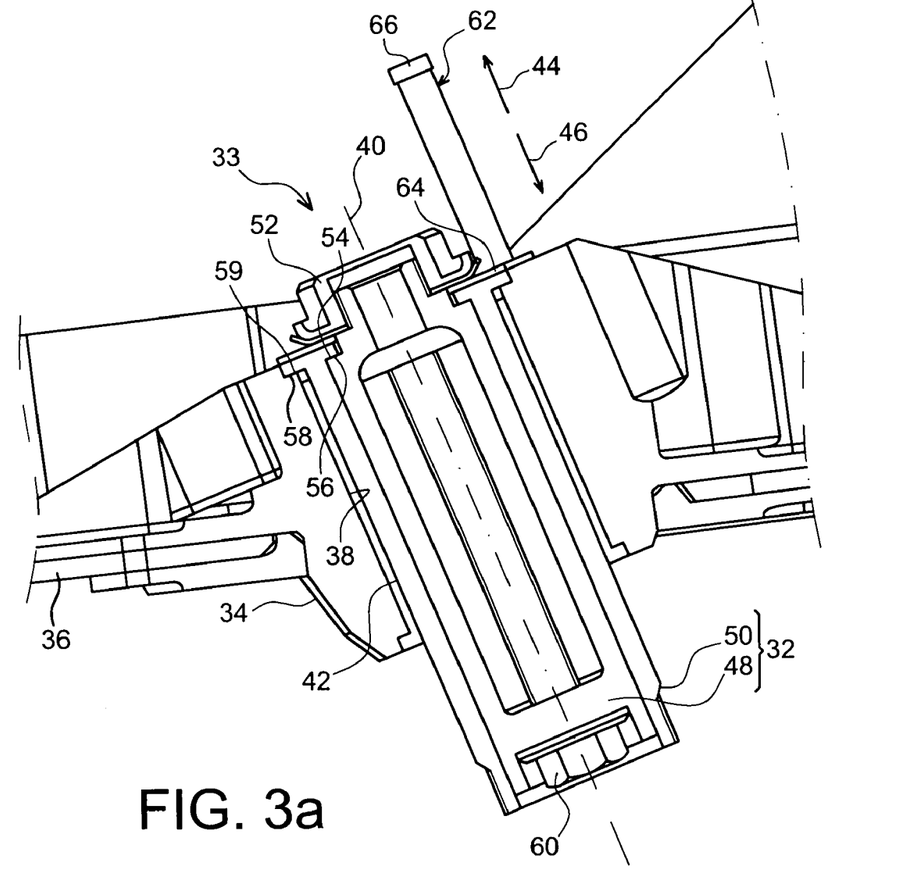
FIGS. 3a to 3d are detailed views of an arrangement belonging to the thrust mount device shown FIG. 2, this arrangement shown in different configurations being adapted to connect the evener bar of the thrust mount device onto the rigid structure of the engine mount.

With reference now to FIG. 3a, an arrangement 33 is described according to a preferred embodiment of the present invention, this arrangement 33 therefore being adapted to connect the evener bar 28 (not shown) to the rigid structure 8 of the engine mount 4. In this FIG. 3a, the arrangement 33 is shown in an identical configuration to the one assumed subsequently when the evener bar is mounted on the pin system 32. More precisely, the pin system 32 then lies in a position called a normal extended position, in which it projects sufficiently downwards relative to the bracket 34 so that it can cooperate with the evener bar 28.

Again with reference to FIG. 3a, it can be seen that the arrangement 33 comprises the bracket 34 fixedly mounted on the lower spar 36 e.g. between two directly consecutive ribs (not shown) of the rigid structure 8, this bracket 34 projecting downwardly relative to the spar 36 and through which a first pin system passageway 38 passes extending along a first longitudinal axis 40. Preferably, axis 40 lies in a plane XZ and lies at an angle relative to direction Z so that it extends towards the aft and downwardly away from the rigid structure 8.

Evidently, since the pin system 32 passes through the first pin system passageway 38, it also has the same angle as just described for axis 40, namely it extends towards the aft away from the rigid structure. Also, it is noted that a sacrificial friction ring 42 can be inserted between the pin system 32 and the first passageway 38.

One of the particular aspects of the present invention is that the pin system 32 is slidingly mounted in the first passageway 38 so that it can be moved along the first longitudinal axis 40, in a first direction 44, from the normal extended position shown FIG. 3a to a so-called retracted position in which it is retracted inside the bracket 34 (FIG. 3b), and conversely in a second direction 46 opposite the first, from the retracted position to the normal extended position.

The pin system 32 preferably comprises an inner pin 48 and an outer pin 50 that are concentric, these two pins being secured to one another via any means. In the preferred embodiment shown, this securing between the outer pin 50 which can be called a main pin and the inner pin 48 which can be called a <<Fail Safe>> pin, is achieved using a combination of an abutment and a nut 52 mounted on an upper end of pin 48 and bearing against an upper end of pin 50. The above-mentioned abutment is obtained with shoulders 54, 56 respectively provided on pins 48 and 50, and designed so that they can stop movement of pin 48 upwardly with respect to pin 50 when screwing the nut 52. Thereafter the pin system 32 becomes a compact, joined assembly able to slide within the first passageway 38.

The pin system 32 is held in its normal extended position shown FIG. 3a using abutment means which can block the system in translation in the second direction 46 relative to the bracket 34. These abutment means belonging to pin system 32 are preferably in the shape of a shoulder 58 provided on an upper end of the outer pin 50, this shoulder 58 therefore cooperating with an upper bearing surface 59 of the bracket 34.

On the other hand, it is noted that the arrangement 33 is evidently designed to allow movement in translation of the system 32 in the first direction 44 relative to the bracket 34, when this system takes up its normal extended position.

A further particular aspect of the present invention lies in the fact that the arrangement 33 comprises a pin extending member carried on the inside by the inner pin 48 of the pin system, this member 60 being able to be moved parallel to the first longitudinal axis 40, in the second direction 46, from a normal retracted position such as shown FIG. 3a in which it is retracted inside the inner pin 48, to an extended position in which it is joined to the pin system 32 and projects beyond it, and conversely in the first direction 44 from the extended position to the normal retracted position. As will be explained in more detail below this member 60, when deployed, is able to enter easily into the passageway provided in the evener bar, when the pin system 32 lies in its retracted position. In this manner the pin extending member 60, passing through the pin system passageway of the evener bar, and preferably extending beyond the latter, is therefore able to become a grasping member, abutment member, etc. . . . easily accessible by the operator, the movement applied to it being directly transmitted to the pin system 32 to which it is joined. It therefore becomes easy to cause the pin system 32 to enter into the pin system passageway of the evener bar, by simply setting member 60 in movement.

To house the pin extending member 60 in the inner pin 48, this inner pin is therefore of hollow shape. Also, in the preferred case in which the member 60 consists of a simple screw, the inner pin 48 must also be provided with a thread intended to cooperate with the screw.

By way of indication, it is noted that the ratio between the diameter of the screw 60, preferably arranged along the first longitudinal axis 40, and the diameter of the pin system 32 identical to the diameter of the outer pin 50, preferably lies between 0.2 and 0.8.

Figure 4:
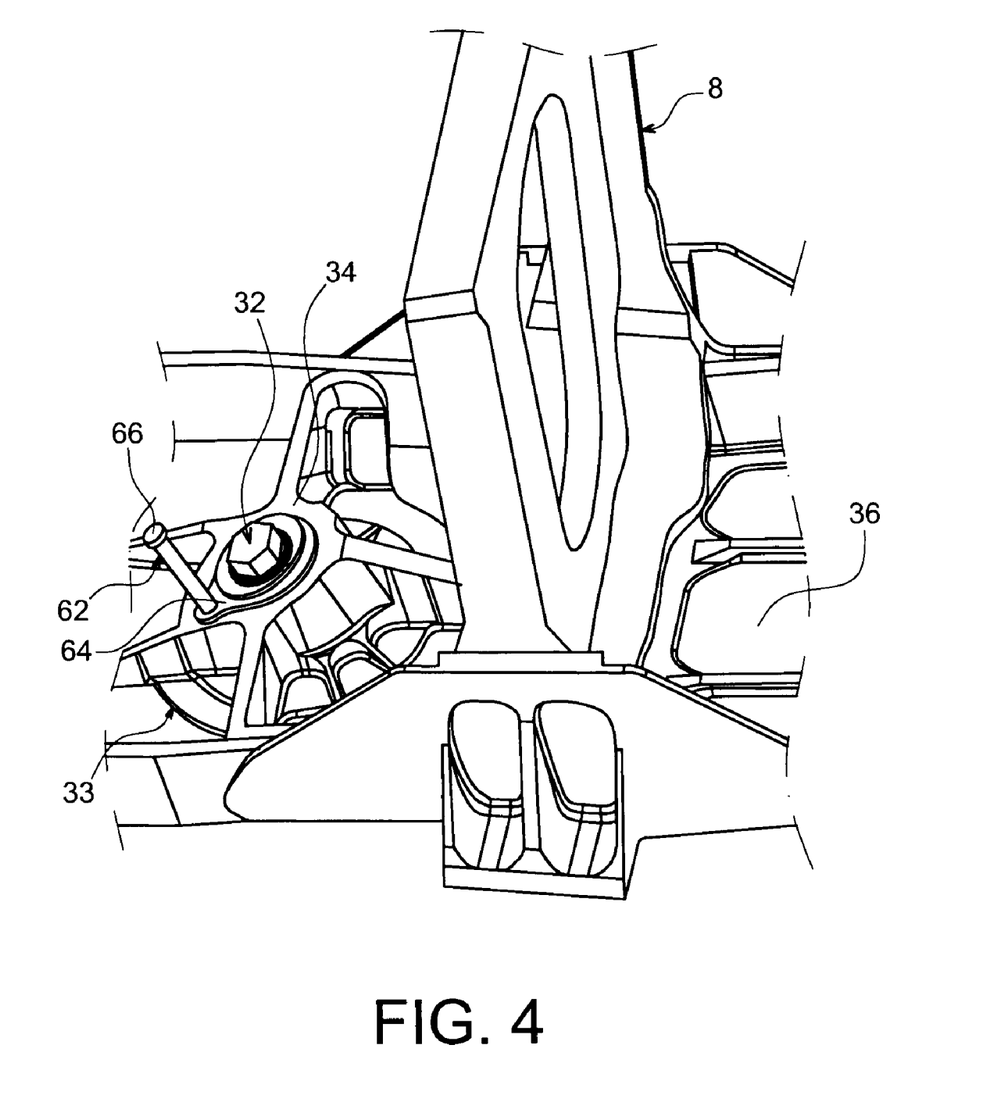
FIG. 4 is an overhead view of the arrangement shown FIGS. 3a to 3d.

With joint reference to FIGS. 3a and 4, it can be seen that the arrangement 33 comprises a guide member 62 for the pin system 32 which is secured to the bracket 34. More precisely, this guide member 62 is in the shape of a rod/arm offset from the longitudinal axis 40 and parallel to it. It projects in the first direction 44 from an upper portion of the bracket 34, and passes through an orifice made in a plate 64 secured to the pin system 32, for example arranged between the nut 52 and the outer pin 50.

Therefore, when the pin system 32 is set in movement, the cooperation with little clearance between the orifice of the plate 64 and the guide member 62 is not only able to ensure that the system 32 translates along the direction of axis 40 relative to the bracket 34, but more especially prevents rotation of the pin system 32 about this same first longitudinal axis 40. This advantageously limits the risks of the pin system 32 becoming blocked inside its first associated passageway 38.

Additionally, the guide member 62 located inside the rigid casing is provided with an abutment 66 able to block the pin system in translation in the first direction 44 with respect to the bracket 34. This abutment 66 is positioned at the upper end of the rod, at a point where it prevents the pin system 32 from fully exiting the first passageway 38.

Figure 3B:
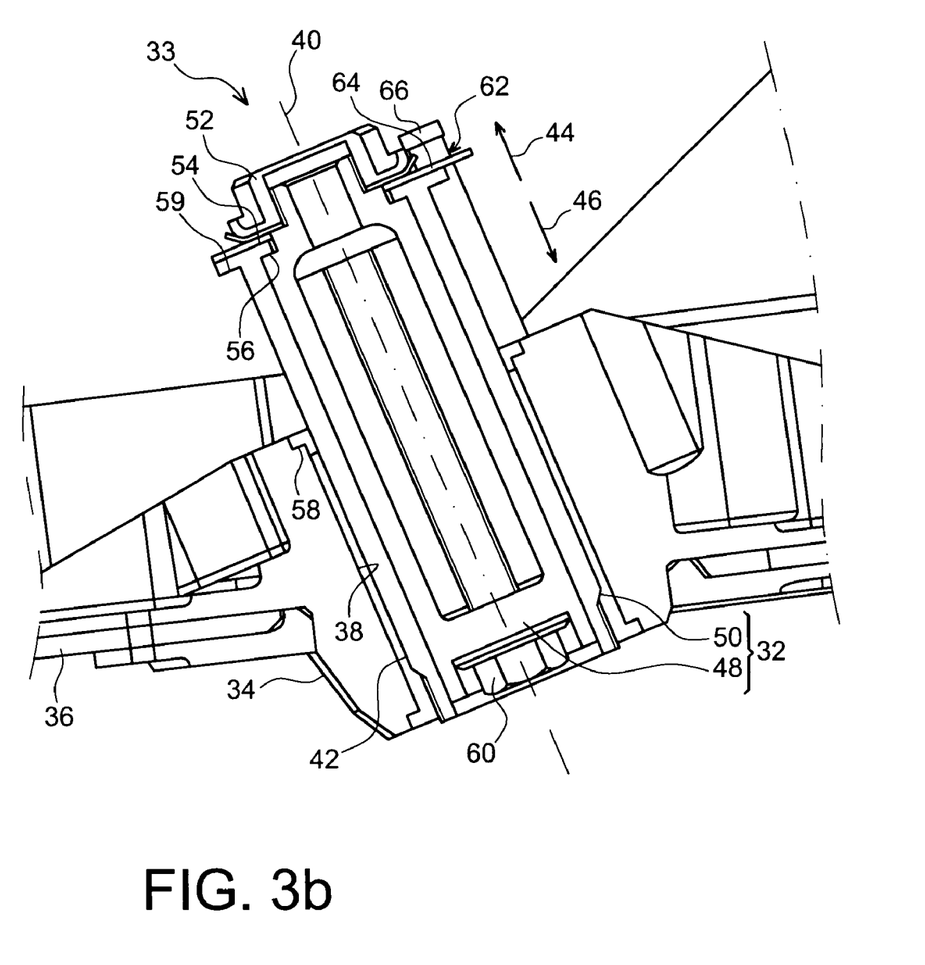

With reference now to FIG. 3b, the arrangement 33 can be seen in a different configuration, called <<configuration II>> as opposed to the one shown FIG. 3a corresponding to a normal rest configuration called <<configuration I>>, in which the pin system 32 has been moved in the first direction 44 until it has taken up its retracted position in which it is retracted inside the bracket 34, the pin extending member 60 still lying in its normal retracted position in which it is retracted in the pin system 32. Preferably, it can be provided that in this configuration the pin system 32 no longer projects downwardly from the bracket 34. Also, it is indicated that this configuration can be maintained by blocking the sliding pin system 32 in any manner with respect to the bracket 34, in the second direction.

Figure 3C:
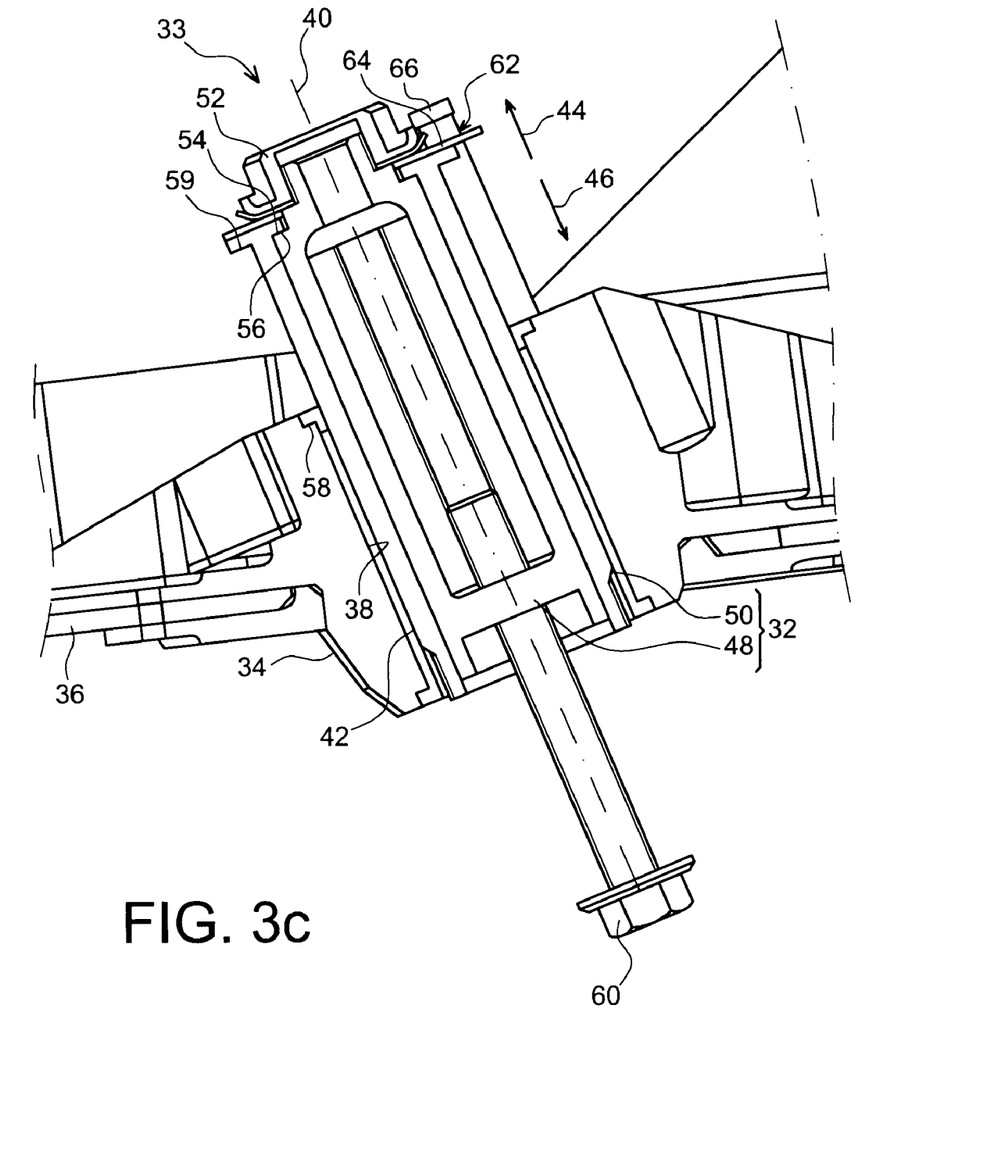

With reference to FIG. 3c, the arrangement 33 can be seen in yet another configuration, called <<configuration III>> in which the pin system 32 is still in its retracted position held by any means, whilst the pin extending member 60 has been moved along axis 40 in the second direction 46 as far as its extended position in which it is joined to the pin system 32 and projects beyond it in downward direction. Evidently, the movement of the pin extending member 60 in the second direction 46 is made by unscrewing the screw. Also, the cooperation between the threads of this screw and those of the inner pin 48 simultaneously achieves the holding of the screw in its extended position, and the securing of this pin extending member 60 to the pin system 32.

Figure 3D:
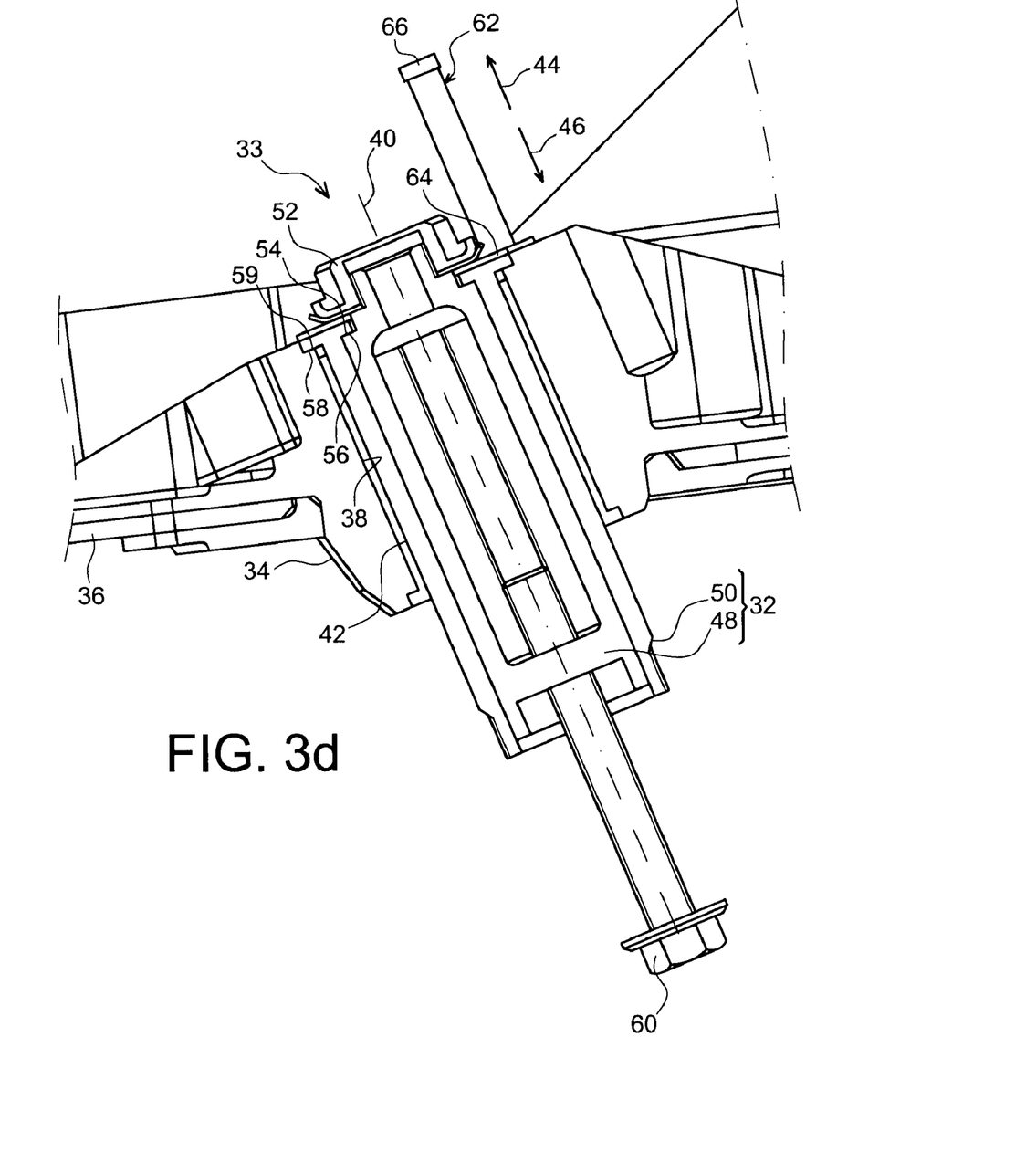

Finally, FIG. 3d shows another configuration called <<configuration IV>> in which the pin system 32 has been returned to its normal extended position, held in place by contact between the shoulder 58 of pin 50 and surface 59, whilst the pin extending member 60 still lies in its extended position.

All these configurations are intended to be successively assumed by the arrangement 33 when implementing a method to mount an aircraft engine onto a rigid structure of an engine mount, as will be seen below in the detailed description of said method.

Figure 5:
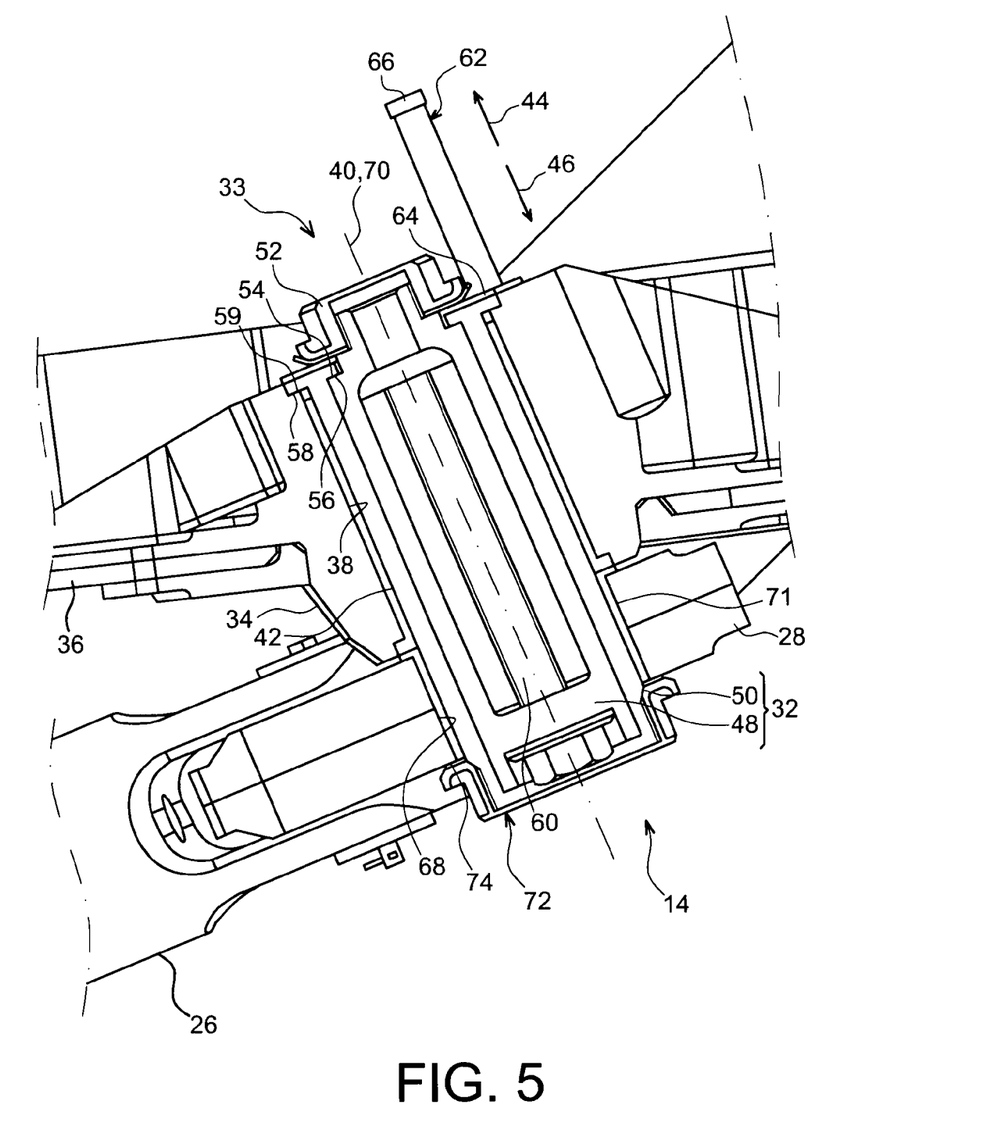
FIG. 5 is a detailed side view of the thrust mount device shown FIG. 2, this device incorporating an arrangement such as shown FIGS. 3a to 3d.

With reference now to FIG. 5, the thrust mount device 14 can be seen in more detail, incorporating the arrangement 33 just described, the thrust mount device 14 being shown in a fully mounted configuration identical to configuration I, in which the evener bar 28 cooperates with the pin system 32.

As mentioned previously, the thrust mount device 14 not only comprises the arrangement 33, but also two side thrust links 26 each comprising a forward end connected to the engine, and an aft end connected to the evener bar 28 through which a second pin system passageway passes 68. This second passageway 68 therefore extends along a second longitudinal axis 70 which, if the device 14 lies in the fully mounted configuration such as shown, merges with the first longitudinal axis 40. Also, the pin system 32 of arrangement 33 evidently passes through this second passageway 68, and here again it is possible to provide for a sacrificial friction ring 71 between the pin system 32 and the second passageway 68.

Device 14 also comprises dismountable means 72 to block the pin system 32 in translation, preventing translational movement of the pin system through the first and second passageways 38, 68 in the first direction 44. These means 72 are evidently mounted on the pin system 32 only after this system has passed through the second passageway 68, to finalise mounting of the device 14.

Preferably, the dismountable means for blocking translation are in the form of a nut 72 screwed onto a lower end of the outer pin 50, bearing upon a lower bearing surface 74 of the evener bar 28. Therefore once the thrust mount device 14 is fully mounted, the pin system 32 is blocked in translation along axis 40 in both directions 44, 46, respectively by cooperation between the shoulder 58 and the surface 59, and by cooperation between the nut 72 and surface 74. Evidently, this blocking is obtained when the evener bar 28 bears against the bracket 34 carrying the pin system 32, without necessarily being in direct contact therewith.

With reference now to FIGS. 6a to 6d, different operations are schematised to show an assembly step of the evener bar 28 onto the arrangement 33, this step being conducted when implementing a method to mount an aircraft engine on a rigid structure of an engine mount.

Figure 6A:
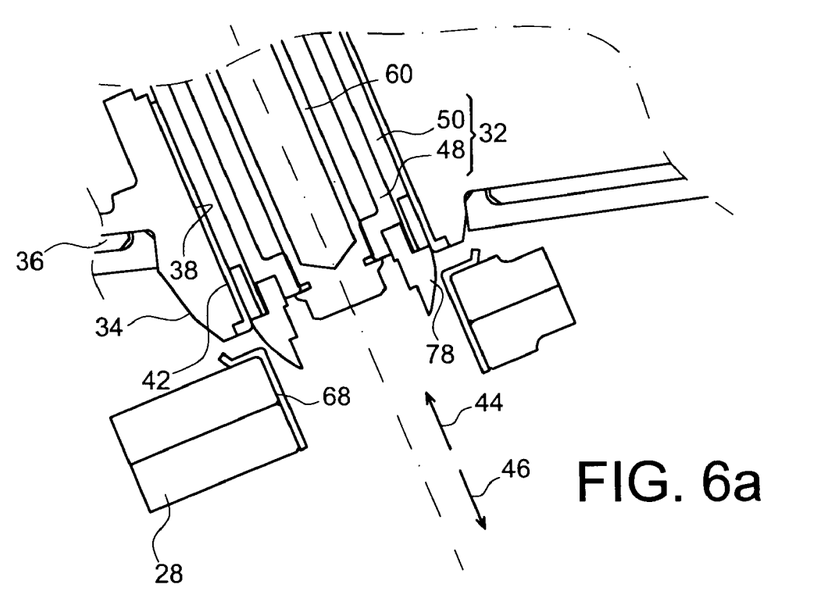
FIGS. 6a to 6d are views schematising different operations of a step to assemble the evener bar onto the arrangement shown FIGS. 3a to 3d, this step being conducted when implementing a method to mount an aircraft engine on a rigid structure of an engine mount.

When implementing said method, first it is preferable for the evener bar 28 to be connected to the engine 6 via the links 26, whilst the arrangement 33 is previously mounted on the rigid structure 8, in readiness in configuration I.

The method then preferably starts conventionally by lifting the engine 6 vertically towards the engine mount 4 using conventional means, until the engine reaches its final position relative to the engine mount or a position close thereto.

At a given time during vertical movement of the engine 6 towards its final position, the lower end of the pin system 32 of the arrangement 33 comes to bear against the evener bar 28 following the movement of this same engine. In this respect, prior to lifting, it is possible to mount an olive-shaped guide 78 onto a lower end of the system 32, such as can be seen FIG. 6a, so that this head coincides with the second passageway 68 into which it is therefore able to enter. In this manner, the bearing of the guide 78 against the upper part of the second passageway 68 which it partly enters, leads to displacement of the system 32 in the first direction 44 during the latter stage of engine lifting. Therefore it is to be appreciated that the system 32 is moved automatically from its normal extended position to its retracted position during vertical movement of the engine, by mere bearing against the evener bar 28 in movement.

At this moment when the engine lies in its final position or close thereto, the arrangement 33 is then held in configuration II by the evener bar 28 as can be seen FIG. 6a.

Next it is preferable to proceed with a mounting step of the forward engine attachment 10 and a step to mount the aft engine attachment 12 on the engine mount, in conventional manner known to those skilled in the art.

The assembly step of the evener bar 28 can then be started when the pin system 32 lies in configuration II, as shown FIGS. 3b and 6a.

Figure 6B:
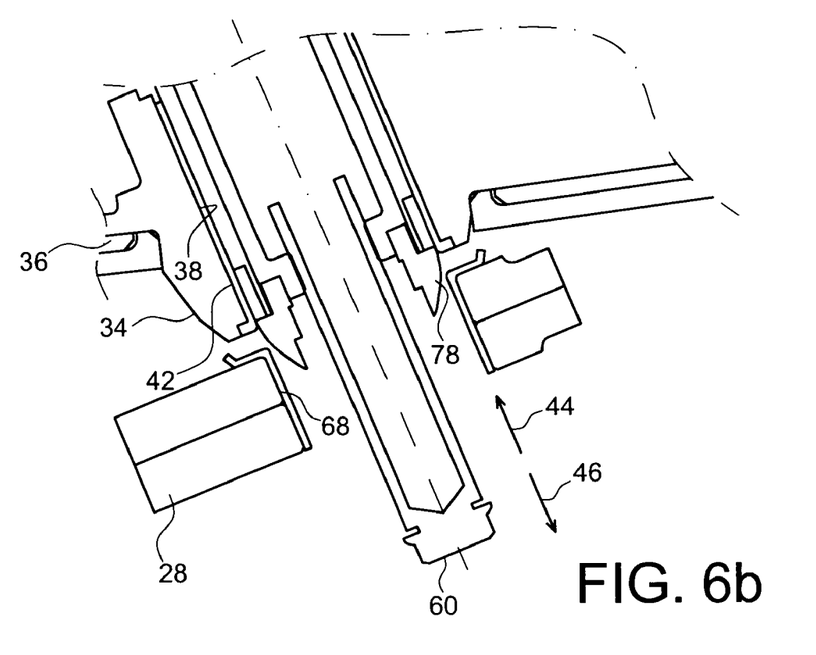

Thereafter, a first operation consists of moving the pin extending member 60, in the second direction 46 with respect to the pin system 32 lying in its retracted position, so that it passes through the second passageway 68 until it reaches its extended position, as shown FIG. 6b. The arrangement 33 then lies in configuration III, in which it can be seen that the extending member 60 projects substantially from the evener bar 28 in downward direction. Evidently, this changeover to the extended position is simply achieved by unscrewing the screw 60, which does not entail any displacement of the pin system 32 which remains held in its retracted position.

Figure 6C:
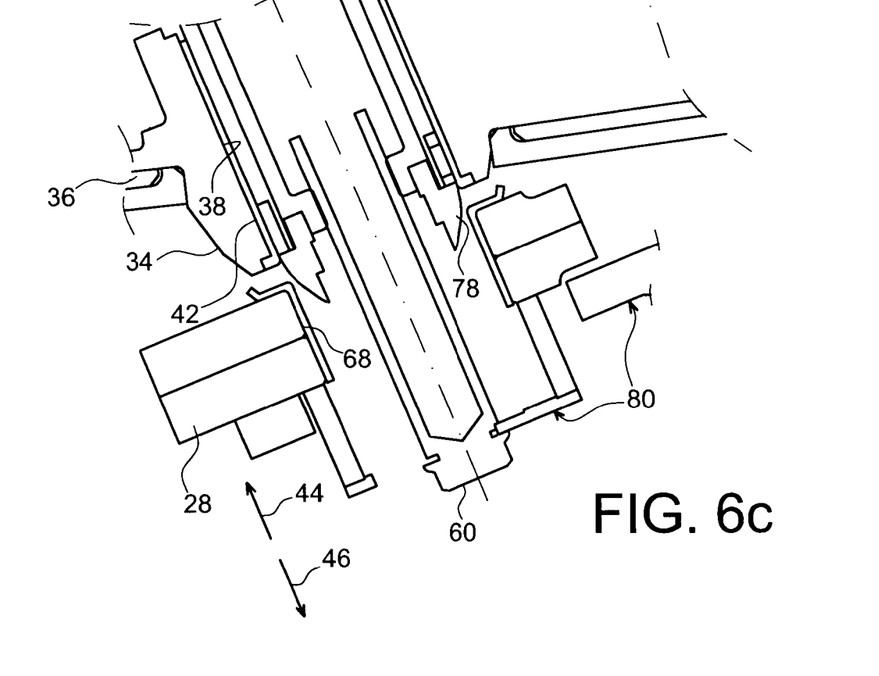
Figure 6D:
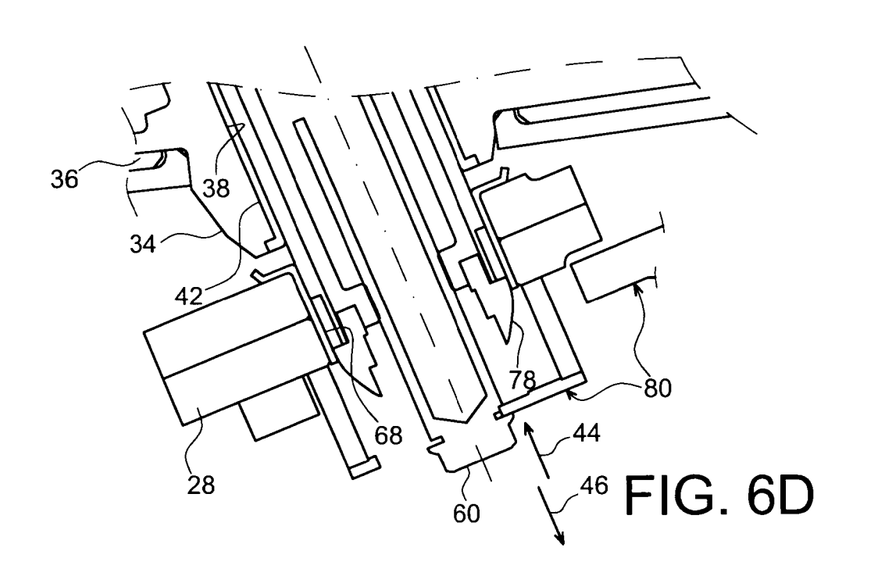

Then, the pin extending member 60 is set in movement, so as to cause displacement of the pin system 32 in the second direction 46, through the first and second passageways 38, 68. This setting in movement, schematised FIGS. 6c and 6d is performed for example using tooling which takes up opposite bearing points on the evener bar 28 and pin extending member 60 respectively, such as a <<bell crank>>. Once this bell crank 80 is installed as mentioned previously, all that is required is to rotate the screw 60 acting as worm screw to cause movement in the second direction 46 of the inner pin 48 and hence of the whole pin system 32 as schematically illustrated FIG. 6d. During this rotation, the screw 60 therefore rotates while remaining in an identical position with respect to the evener bar 28 along axis 40, while gradually entering into the pin system 32 moving in the second direction.

Finally, if necessary, an operation is initiated to move the pin extending member 60, still in the first direction 44 with respect to the pin system 32 lying in its normal extended position, so as to bring it to its normal retracted position. Evidently, this operation is performed after removing the bell crank 80, and only if the rotating of the screw 60 during the preceding operation has not already led to placing it in its normal retracted position.

Finally, after the guide has been removed, the dismountable means 72 blocking translation are then assembled on the pin system 32, which leads to obtaining the full mounting of the engine on its associated engine mount, as shown FIG. 5.

Evidently, various modifications can be made by those skilled in the art to the engine mount 4, thrust mount device 14, arrangement 33 and the mounting method just described solely as non-limiting examples. In this respect, it can be indicated that if the invention has been described to allow the securing of an engine below an aircraft wing, it could also be carried out to ensure positioning of this engine above this same wing.

The invention claimed is:

1. An arrangement configured to connect an evener bar of a thrust mount device, transferring thrust loads generated by an aircraft engine, onto a rigid structure of an engine mount, the arrangement comprising:
    a bracket configured to be fixedly mounted on the rigid structure and through which a first pin system passageway passes extending along a first longitudinal axis; and
    a pin system passing through the first pin system passageway,
    wherein the pin system is slidingly mounted in the first passageway so that the pin system can be moved along the first longitudinal axis in a first direction from a normal extended position in which the pin system projects sufficiently with respect to the bracket so that the pin system can cooperate with the evener bar, to a retracted position in which the pin system is retracted within the same bracket, and conversely in a second direction from the retracted position to the normal extended position; and
    wherein the arrangement further comprises a pin extending member carried internally by the pin system and configured to be moved parallel to the first longitudinal axis, in the second direction from a normal retracted position in which the pin extending member is retracted within the pin system, to an extended position in which the pin extending member is joined to the pin system and projects beyond the pin system, and conversely in the first direction from the extended position to the normal retracted position.

2. An arrangement according to claim 1, wherein the pin system includes abutment means used to block the pin system in translation in the second direction relative to the bracket, when the pin system lies in its normal extended position.

3. An arrangement according to claim 2, wherein the abutment means include a shoulder provided on the pin system.

4. An arrangement according to claim 1, further comprising a guide member for the pin system, secured to the bracket.

5. An arrangement according to claim 4, wherein the guide member includes an abutment configured to block the pin system in translation in the first direction relative to the bracket.

6. An arrangement according to claim 4, wherein the guide member is configured to prevent rotation of the pin system about the first longitudinal axis during translation movement of the pin system along the first longitudinal axis.

7. An arrangement according to claim 1, wherein the pin extending member includes a screw mounted on the pin system, the screw entering the pin system.

8. An arrangement according to claim 7, wherein the screw is arranged along the first longitudinal axis.

9. An arrangement according to claim 1, wherein the pin system comprises an inner pin and an outer pin that are concentric, the inner and outer pins being secured to each other and the inner pin being hollow to house the pin extending member.

10. A thrust mount device transferring thrust loads generated by an aircraft engine, the device configured to be positioned between the engine and a rigid structure of an engine mount, and comprising:
    an arrangement according to claim 1;
    two side thrust links each comprising one forward end configured to be connected to the engine, and one aft end; and
    an evener bar on which the two aft ends of side thrust links are pivoted, a second pin system passageway passing through the evener bar and extending along a second longitudinal axis merging with the first longitudinal axis, the pin system of the arrangement passing through the second passageway.

11. A thrust mount device according to claim 10, further comprising dismountable means to block the pin system in translation, preventing translational movement of the pin system through the first and second passageways in the first direction.

12. A thrust mount device according to claim 11, wherein the dismountable means for blocking in translation include a nut screwed onto the pin system and bearing upon the evener bar.

13. An engine mount for an engine configured to be inserted between an aircraft wing and the engine, the engine mount comprising:
    a rigid structure and mounting means to mount the engine on the rigid structure, the mounting means comprising a thrust mount device transferring thrust loads generated by the engine according to claim 10.

14. An engine mount according to claim 13, wherein the mounting means further comprises a forward attachment fixed to a first point of the rigid structure, and an aft attachment fixed to a second point of the rigid structure, and wherein the thrust mount device is fixed to the rigid structure at a third point separate from the first and second points.

15. An engine mount according to claim 13, wherein the pin system is positioned at an angle relative to a vertical direction of the engine mount.

16. An engine mount according to claim 15, wherein the pin system extends towards the aft away from the rigid structure.

17. A method to mount an aircraft engine on a rigid structure of an engine mount according to claim 13, comprising:
assembling the evener bar, previously connected to the engine via links, onto the arrangement previously mounted on the rigid structure, the assembling comprising:
moving the pin extending member in the second direction relative to the pin system lying in its retracted position, so that the pin extending member passes through the second passageway provided on the evener bar until the pin extending member reaches its extended position; and
setting in movement the pin extending member to cause displacement of the pin system through the first and second pin system passageways towards its normal extended position.

18. A mounting method according to claim 17, wherein prior to the assembling the evener bar, the pin system is moved from its normal extended position to its retracted position by bearing against the evener bar when lifting the engine towards its final position relative to the engine mount.

19. A mounting method according to claim 17, wherein the assembling the evener bar is preceded by mounting a forward engine attachment and mounting an aft engine attachment.

20. A mounting method according to claim 17, wherein the setting the pin extending member in movement so as to cause displacement of the pin system through the first and second passageways is performed using tooling having opposite bearing points on the evener bar and on the pin extending member respectively, and by rotating the pin extending member in a form of a screw cooperating with the pin system.

21. A mounting method according to claim 17, wherein the setting the pin extending member in movement so as to cause displacement of the pin system through the first and second passageways is performed using an olive-shaped guide mounted on one end of the pin system.

* * * * *